US012806793B2

(12) United States Patent
Hasegawa et al.

(10) Patent No.: US 12,806,793 B2
(45) Date of Patent: Nov. 24, 2026

(54) APPARATUS, CONTROL METHOD FOR APPARATUS, AND RECORDING MEDIUM

(71) Applicant: CASIO COMPUTER CO., LTD., Tokyo (JP)

(72) Inventors: Hirokazu Hasegawa, Koganei (JP); Chihiro Toyama, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 150 days.

(21) Appl. No.: 18/243,561

(22) Filed: Sep. 7, 2023

(65) Prior Publication Data

US 2024/0091954 A1 Mar. 21, 2024

(30) Foreign Application Priority Data

Sep. 21, 2022 (JP) ................................ 2022-150384

(51) Int. Cl.

*B25J 11/00* (2006.01)
*A63H 3/00* (2006.01)
*A63H 13/00* (2006.01)
*A63H 13/02* (2006.01)
*G05B 15/02* (2006.01)
*G10K 15/04* (2006.01)
*H04R 3/04* (2006.01)

(52) U.S. Cl.

CPC .......... *B25J 11/001* (2013.01); *A63H 13/005* (2013.01); *A63H 13/02* (2013.01); *G05B 15/02* (2013.01); *G10K 15/04* (2013.01); *H04R 3/04* (2013.01); *A63H 3/001* (2013.01); *A63H 2200/00* (2013.01)

(58) Field of Classification Search

CPC ....... B25J 11/001; G05B 15/02; G10K 15/04; H04R 3/04; A63H 2200/00; A63H 13/005; A63H 13/02; A63H 3/001
USPC .................................................. 700/245–264
See application file for complete search history.

(56) References Cited

U.S. PATENT DOCUMENTS

2003/0045203 A1* 3/2003 Sabe ............................ 446/356
2011/0021108 A1* 1/2011 Le ......................... A63H 13/00 446/298

(Continued)

FOREIGN PATENT DOCUMENTS

JP 2001-334482 A 12/2001
JP 2002-049385 A 2/2002

(Continued)

OTHER PUBLICATIONS

EPO; Application No. 23194225.1; Extended European Search Report dated Jan. 31, 2024.

(Continued)

*Primary Examiner* — Jason Holloway
*Assistant Examiner* — Alexandra R. Morford
(74) *Attorney, Agent, or Firm* — Fitch, Even, Tabin & Flannery LLP

(57) ABSTRACT

An apparatus includes a controller that performs control for acquiring a signal expressing an external stimulus acting on the apparatus; setting, based on the signal, a pseudo-emotion; and adjusting, based on the set pseudo-emotion, a content of control for the sound outputter or the driver of the apparatus, the content of the control being stored in advance in a storage.

15 Claims, 13 Drawing Sheets

(56) References Cited

U.S. PATENT DOCUMENTS

| | | | | |
|---|---|---|---|---|
| 2015/0165625 | A1* | 6/2015 | Michalowski | B25J 9/1694 901/50 |
| 2018/0143645 | A1* | 5/2018 | Lee | B25J 11/001 |
| 2018/0229134 | A1* | 8/2018 | Pascale | A63H 5/00 |
| 2019/0143528 | A1* | 5/2019 | Hayashi | B25J 11/0015 700/245 |
| 2019/0308327 | A1* | 10/2019 | Wolford | B25J 9/162 |
| 2021/0129035 | A1* | 5/2021 | Atsumi | A63H 13/005 |
| 2021/0132685 | A1* | 5/2021 | Atsumi | G06F 3/03547 |
| 2021/0303964 | A1* | 9/2021 | Hasegawa | G06N 3/008 |
| 2022/0097230 | A1* | 3/2022 | Kawabe | A63H 11/18 |
| 2024/0091656 | A1* | 3/2024 | Mazzetti | A63H 3/36 |

FOREIGN PATENT DOCUMENTS

| | | | |
|---|---|---|---|
| JP | 2002-304187 | A | 10/2002 |
| JP | 2002-361582 | A | 12/2002 |
| JP | 2005-278830 | A | 10/2005 |
| JP | 2017-153545 | A | 9/2017 |
| JP | 2017-213612 | A | 12/2017 |
| JP | 6495479 | B2 | 4/2019 |
| JP | 2021-153680 | A | 10/2021 |

OTHER PUBLICATIONS

JPO; Application No. 2022-150384; Notice of Reasons for Refusal dated Aug. 20, 2024.

JPO; Application No. 2024-215082; Notice of Reasons for Refusal dated Jan. 20, 2026.

"Enjoy Chatting with Robots! Voice Interactive System'GoTalk Viston Lite' Part 1", Robocon Magazine, March Issue, 2010, Ohmsha, Ltd., pp. 124 to 127 (Partial Translation).

JPO; Application No. 2024-215082; Decision of Refusal dated Apr. 7, 2026.

* cited by examiner

FIG. 7

124

| CONTROL CONDITION | CONTROL DATA |
|---|---|
| BODY IS PETTED | MOTION DATA<br>0:0:0<br>500:60:0<br>1000:60:60<br>1500:60:−60<br>2000:60:60<br>2500:60:−60<br><br>SOUND EFFECT DATA<br>HAPPY SOUND<br>DESINENCE: 30% |
| HEARD A LOAD SOUND | MOTION DATA<br>0:0:0<br>100:60:0 |
| SPOKEN TO | SOUND EFFECT DATA<br>CHEERFUL SOUND<br>DESINENCE : 50% |
| BREATHING CYCLE ELAPSED | MOTION DATA<br>0:0:0<br>1000:10:0<br>2000:0:0<br>3000:10:0<br>4000:0:0<br>5000:10:0<br>6000:0:0 |
| ⋮ | ⋮ |

APPARATUS, CONTROL METHOD FOR APPARATUS, AND RECORDING MEDIUM

CROSS-REFERENCE TO RELATED APPLICATIONS

This application claims the benefit of Japanese Patent Application No. 2022-150384, filed on Sep. 21, 2022, the entire disclosure of which is incorporated by reference herein.

FIELD OF THE INVENTION

The present disclosure relates to an apparatus, a control method for the apparatus, and a recording medium.

BACKGROUND OF THE INVENTION

Technology is known for controlling the actions of apparatuses such as robots and the like so as to make the apparatuses more similar to familiar beings such as friends or pets. For example, Unexamined Japanese Patent Application Publication No. 2001-334482 describes technology related to action determination of a robot that acts like an animal.

SUMMARY OF THE INVENTION

One aspect of the present disclosure is an apparatus including:

- a sound outputter, a driver, a storage, and a controller, wherein
- the controller performs control for
  - acquiring a signal expressing an external stimulus acting on the apparatus,
  - setting, based on the signal, a pseudo-emotion, and
  - adjusting, based on the set pseudo-emotion, a content of control for the sound outputter or the driver of the apparatus, the content of the control being stored in advance in the storage.

BRIEF DESCRIPTION OF DRAWINGS

A more complete understanding of this application can be obtained when the following detailed description is considered in conjunction with the following drawings, in which:

FIG. 7 is a drawing for explaining an example of a control content table according to Embodiment 1;

DETAILED DESCRIPTION OF THE INVENTION

Figure 1:
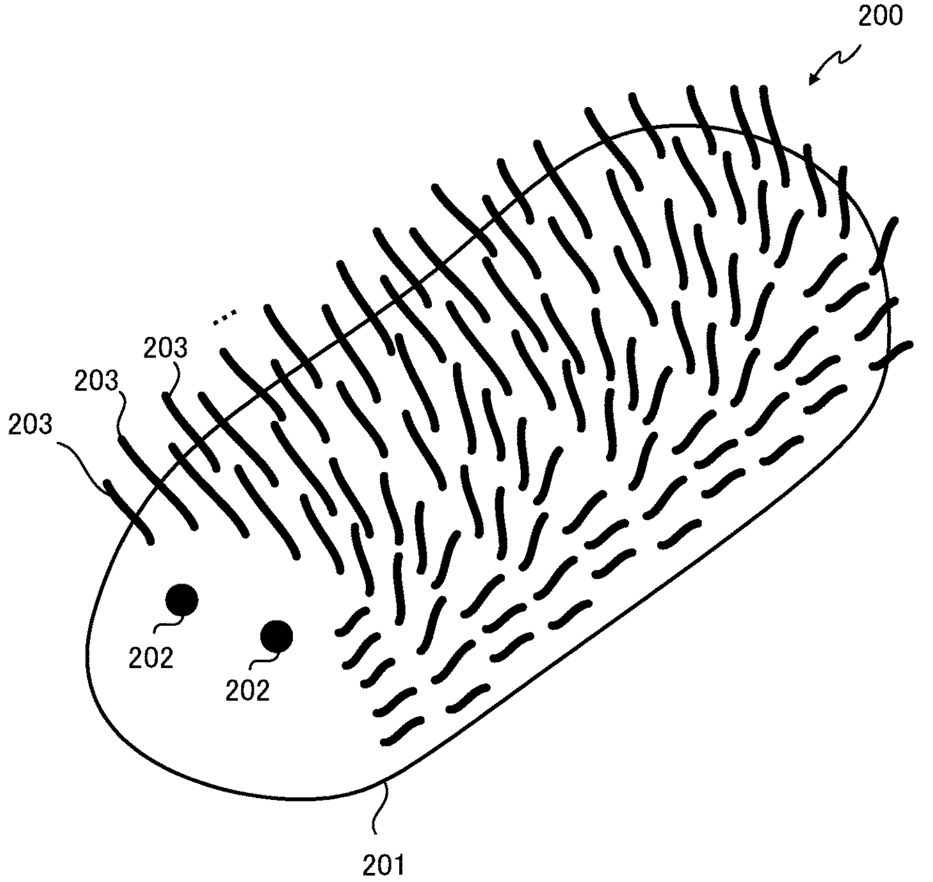
FIG. 1 is a drawing illustrating the appearance of a robot according to Embodiment 1.

Hereinafter, embodiments are described while referencing the drawings. Note that, in the drawings, identical or corresponding components are denoted with the same reference numerals.

Embodiment 1

Figure 2:
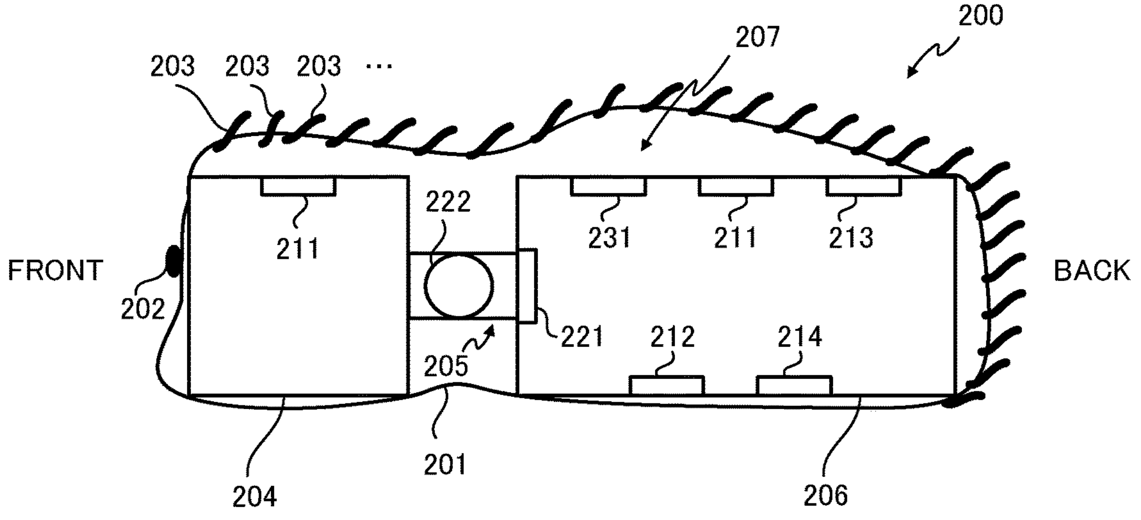
FIG. 2 is a cross-sectional view viewed from a side surface of the robot according to Embodiment 1.

An embodiment in which an apparatus control device according to Embodiment 1 is applied to a robot 200 illustrated in FIG. 1 is described while referencing the drawings. The robot 200 according to the embodiment is a pet robot that resembles a small animal. As illustrated in FIG. 1, the robot 200 is covered with an exterior 201 provided with bushy fur 203 and decorative parts 202 resembling eyes. A housing 207 of the robot 200 is accommodated in the exterior 201. As illustrated in FIG. 2, the housing 207 of the robot 200 includes a head 204, a coupler 205, and a torso 206. The head 204 and the torso 206 are coupled by the coupler 205.

As illustrated in FIG. 2, the torso 206 extends in a front-back direction. Additionally, the torso 206 contacts, via the exterior 201, a placement surface such as a floor, a table, or the like on which the robot 200 is placed. As illustrated in FIG. 2, a twist motor 221 is provided at a front end of the torso 206, and the head 204 is coupled to the front end of the torso 206 via the coupler 205. The coupler 205 is provided with a vertical motor 222. Note that, in FIG. 2, the twist motor 221 is provided on the torso 206, but may be provided on the coupler 205 or on the head 204.

Figure 3:
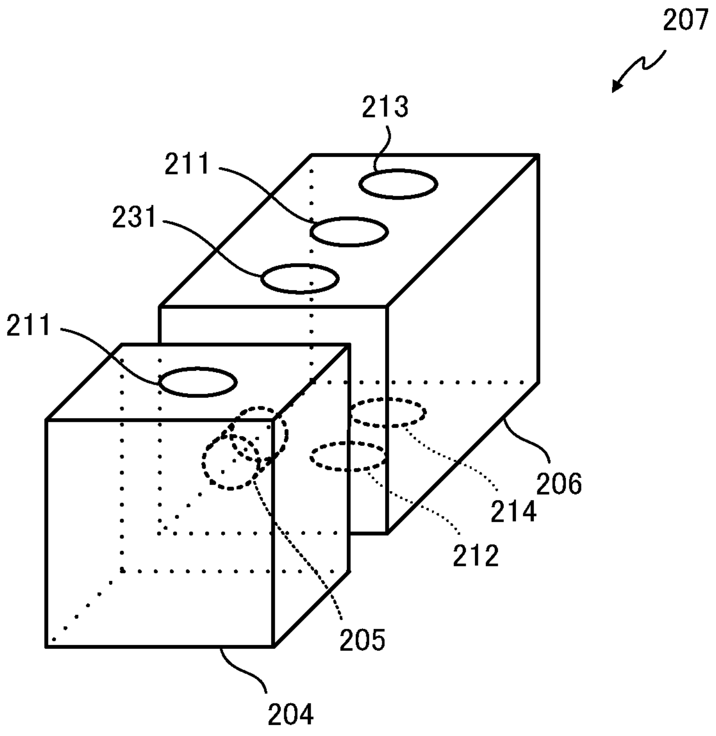
FIG. 3 is a drawing for explaining a housing of the robot according to Embodiment 1.

The coupler 205 couples the torso 206 and the head 204 so as to enable rotation (by the twist motor 221) around a first rotational axis that passes through the coupler 205 and extends in a front-back direction of the torso 206. The twist motor 221 rotates the head 204, with respect to the torso 206, clockwise (right rotation) within a forward rotation angle range around the first rotational axis (forward rotation), counter-clockwise (left rotation) within a reverse rotation angle range around the first rotational axis (reverse rotation), and the like. Note that, in this description, the term "clockwise" refers to clockwise when viewing the direction of the head 204 from the torso 206. Additionally, herein, clockwise rotation is also referred to as "twist rotation to the right", and counter-clockwise rotation is also referred to as "twist rotation to the left." A maximum value of the angle of twist rotation to the right (right rotation) or the left (left rotation) can be set as desired, and the angle of the head 204 in a state, as illustrated in FIG. 3, in which the head 204 is not twisted to the right or the left is referred to as a "twist reference angle."

The coupler 205 couples the torso 206 and the head 204 so as to enable rotation (by the vertical motor 222) around a second rotational axis that passes through the coupler 205 and extends in a width direction of the torso 206. The vertical motor 222 rotates the head 204 upward (forward rotation) within a forward rotation angle range around the second rotational axis, downward (reverse rotation) within a reverse rotation angle range around the second rotational axis, and the like. A maximum value of the angle of rotation upward or downward can be set as desired, and the angle of the head 204 in a state, as illustrated in FIG. 3, in which the head 204 is not rotated upward or downward is referred to as a "vertical reference angle."

When the head 204 is rotated to the vertical reference angle or upward from the vertical reference angle by vertical rotation around the second rotational axis, the head 204 can contact, via the exterior 201, the placement surface such as the floor or the table on which the robot 200 is placed. Note that, in FIG. 2, an example is illustrated in which the first rotational axis and the second rotational axis are orthogonal to each other, but a configuration is possible in which the first and second rotational axes are not orthogonal to each other.

As illustrated in FIG. 2, the robot 200 includes a touch sensor 211 on the head 204. The touch sensor 211 can detect petting or striking of the head 204 by a user. The robot 200 also includes the touch sensor 211 on the torso 206. The touch sensor 211 can detect petting or striking of the torso 206 by the user.

The robot 200 includes an acceleration sensor 212 on the torso 206. The acceleration sensor 212 can detect an attitude (orientation) of the robot 200, and can detect being picked up, the orientation being changed, being thrown, and the like by the user. The robot 200 includes a gyrosensor 214 on the torso 206. The gyrosensor 214 can detect rolling, rotating, and the like of the robot 200.

The robot 200 includes a microphone 213 on the torso 206. The microphone 213 can detect external sounds. Furthermore, the robot 200 includes a speaker 231 on the torso 206. The speaker 231 can be used to emit a sound (sound effect) of the robot 200.

Note that, in the present embodiment, the acceleration sensor 212, the gyrosensor 214, the microphone 213, and the speaker 231 are provided on the torso 206, but a configuration is possible in which all or a portion of these components are provided on the head 204. Note that a configuration is possible in which, in addition to the acceleration sensor 212, gyrosensor 214, the microphone 213, and the speaker 231 provided on the torso 206, all or a portion of these components are also provided on the head 204. The touch sensor 211 is respectively provided on the head 204 and the torso 206, but a configuration is possible in which the touch sensor 211 is provided on only one of the head 204 and the torso 206. Moreover, a configuration is possible in which a plurality of any of these components is provided.

Figure 4:
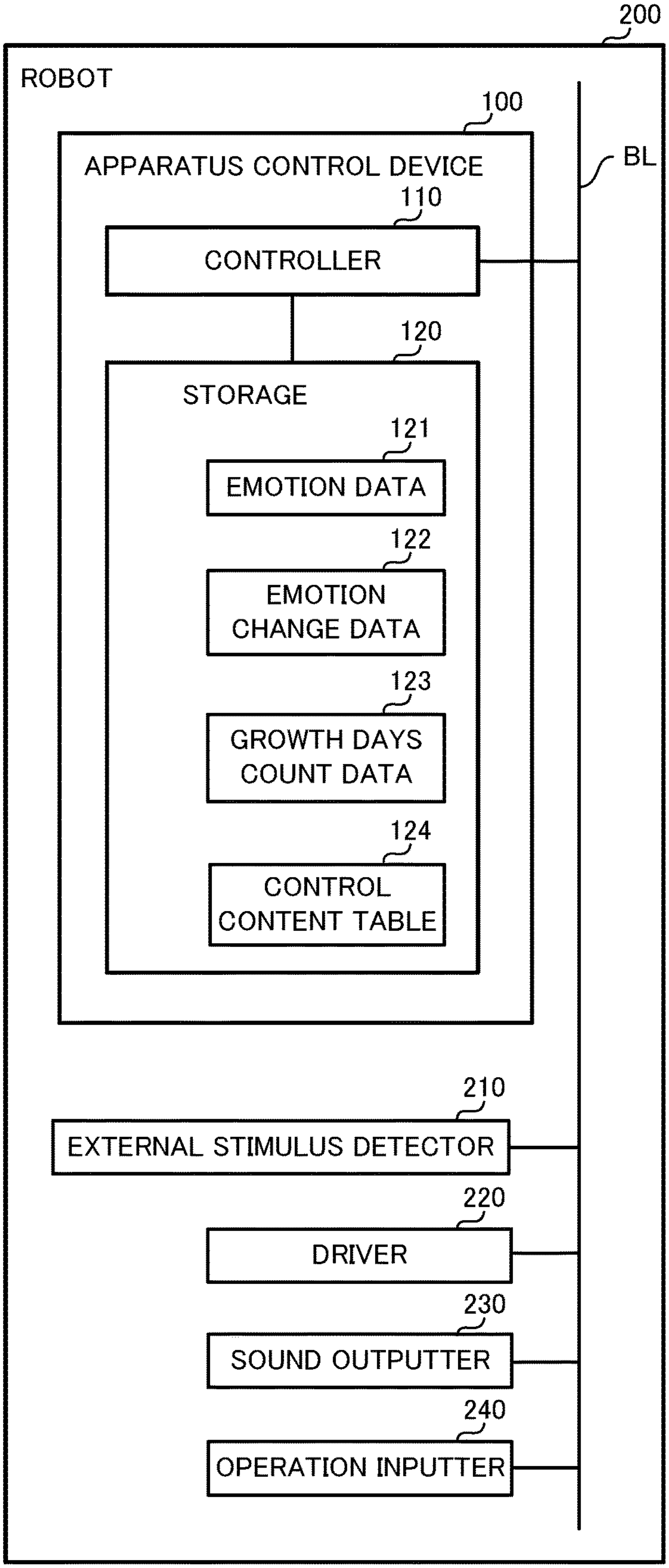
FIG. 4 is a block diagram illustrating the functional configuration of the robot according to Embodiment 1.

Next, the functional configuration of the robot 200 is described. As illustrated in FIG. 4, the robot 200 includes an apparatus control device 100, an external stimulus detector 210, a driver 220, a sound outputter 230, and an operation inputter 240. Additionally, the apparatus control device 100 includes a controller 110, and a storage 120. In FIG. 4, the apparatus control device 100, and the external stimulus detector 210, the driver 220, the sound outputter 230, and the operation inputter 240 are connected to each other via a bus line BL, but this is merely an example.

A configuration is possible in which the apparatus control device 100, and the external stimulus detector 210, the driver 220, the sound outputter 230, and the operation inputter 240 are connected by a wired interface such as a universal serial bus (USB) cable or the like, or by a wireless interface such as Bluetooth (registered trademark) or the like. Additionally, a configuration is possible in which the controller 110 and the storage 120 are connected via the bus line BL.

The apparatus control device 100 controls, by the controller 110 and the storage 120, actions of the robot 200.

In one example, the controller 110 is configured from a central processing unit (CPU) or the like, and executes various processings (robot control processing and the like), described later, using programs stored in the storage 120. Note that the controller 110 is compatible with multithreading functionality in which a plurality of processings are executed in parallel. As such, the controller 110 can execute the various processings (robot control processing, sound effect playback thread, motion playback thread, and the like), described later, in parallel. Additionally, the controller 110 is provided with a clock function and a timer function, and can measure the date and time, and the like.

The storage 120 is configured from read-only memory (ROM), flash memory, random access memory (RAM), or the like. Programs to be executed by the CPU of the controller 110, and data needed in advance to execute these programs are stored in the ROM. The flash memory is writable non-volatile memory, and stores data that is desired to be retained even after the power is turned OFF. Data that is created or modified during the execution of the programs is stored in the RAM.

The external stimulus detector 210 includes the touch sensor 211, the acceleration sensor 212, the gyrosensor 214, and the microphone 213 described above. The controller 110 acquires, as a signal expressing an external stimulus acting on the robot 200, detection values (external stimulus data) detected by the various sensors of the external stimulus detector 210. Note that a configuration is possible in which the external stimulus detector 210 includes sensors other than the touch sensor 211, the acceleration sensor 212, the gyrosensor 214, and the microphone 213. The types of external stimuli acquirable by the controller 110 can be increased by increasing the types of sensors of the external stimulus detector 210.

The touch sensor 211 detects contacting by some sort of object. The touch sensor 211 is configured from a pressure sensor or a capacitance sensor, for example. A detection value detected by the touch sensor 211 expresses the strength of contact. Additionally, the touch sensor 211 is capable of directional contact detection, and detects the strength of contact in three axial directions, namely contact from the front-back direction (the X-axis direction), contact from a width (left-right) direction (Y-axis direction), and contact from a vertical direction (Z-axis direction) of the torso 206 of the robot 200. Therefore, the detection value of the touch sensor 211 is three-dimensional data constituted by values of the strength of contact from the X-axis direction, the strength of contact from the Y-axis direction, and the strength of contact from the Z-axis direction. The controller 110 can, on the basis of the detection value from the touch sensor 211, detect that the robot 200 is being pet, is being struck, and the like by the user.

The acceleration sensor 212 detects acceleration in three axial directions, namely the front-back direction (X-axis direction), the width (left-right) direction (Y-axis direction), and the vertical direction (Z direction) of the torso 206 of the robot 200. Therefore, the acceleration value detected by the acceleration sensor 212 is three-dimensional data constituted by values of X-axis direction acceleration, Y-axis direction acceleration, and Z-axis direction acceleration. The acceleration sensor 212 detects gravitational acceleration when the robot 200 is stopped and, as such, the controller 110 can detect a current attitude of the robot 200 on the basis of the gravitational acceleration detected by the acceleration sensor 212. Additionally, when, for example, the user picks up or throws the robot 200, the acceleration sensor 212 detects, in addition to the gravitational acceleration, acceleration caused by the movement of the robot 200. Accordingly, the controller 110 can detect the movement of the robot 200 by removing the gravitational acceleration component from the detection value detected by the acceleration sensor 212.

The gyrosensor 214 detects an angular velocity from when rotation is applied to the torso 206 of the robot 200. Specifically, the gyrosensor 214 detects the angular velocity on three axes of rotation, namely rotation around the front-back direction (the X-axis direction), rotation around the width (left-right) direction (the Y-axis direction), and rotation around the vertical direction (the Z-axis direction) of the torso 206. Therefore, an angular velocity value detected by the gyrosensor 214 is three-dimensional data constituted by the values of X-axis rotation angular velocity, Y-axis rotation angular velocity, and Z-axis rotation angular velocity. The controller 110 can more accurately detect the movement of the robot 200 by combining the detection value detected by the acceleration sensor 212 and the detection value detected by the gyrosensor 214.

Note that the touch sensor 211, the acceleration sensor 212, and the gyrosensor 214 are synchronized, detect each of the strength of contact, the acceleration, and the angular velocity at the same timing, and output the detection values to the controller 110. Specifically, the touch sensor 211, the acceleration sensor 212, and the gyrosensor 214 detect the strength of contact, the acceleration, and the angular velocity at the same timing every 0.25 seconds, for example.

The microphone 213 detects ambient sound of the robot 200. The controller 110 can, for example, detect, on the basis of a component of the sound detected by the microphone 213, that the user is speaking to the robot 200, that the user is clapping their hands, and the like.

The driver 220 includes the twist motor 221 and the vertical motor 222. The driver 220 is driven by the controller 110. As a result, the robot 200 can express actions such as, for example, lifting the head 204 up (rotating upward around the second rotational axis), twisting the head 204 sideways (twisting/rotating to the right or to the left around the first rotational axis), and the like. Motion data for driving the driver 220 in order to express these actions is recorded in a control content table 124, described later.

The sound outputter 230 includes the speaker 231, and sound is output from the speaker 231 as a result of sound data being input into the sound outputter 230 by the controller 110. For example, the robot 200 emits a pseudo-animal sound as a result of the controller 110 inputting animal sound data of the robot 200 into the sound outputter 230. This animal sound data is also recorded as sound effect data in the control content table 124.

In one example, the operation inputter 240 is configured from an operation button, a volume knob, or the like. The operation inputter 240 is an interface for receiving user operations such as, for example, turning the power ON/OFF, adjusting the volume of the output sound, and the like.

Next, of the data stored in the storage 120 of the apparatus control device 100, the data unique to the present embodiment, namely, emotion data 121, emotion change data 122, growth days count data 123, and the control content table 124 are described in order.

Figure 5:
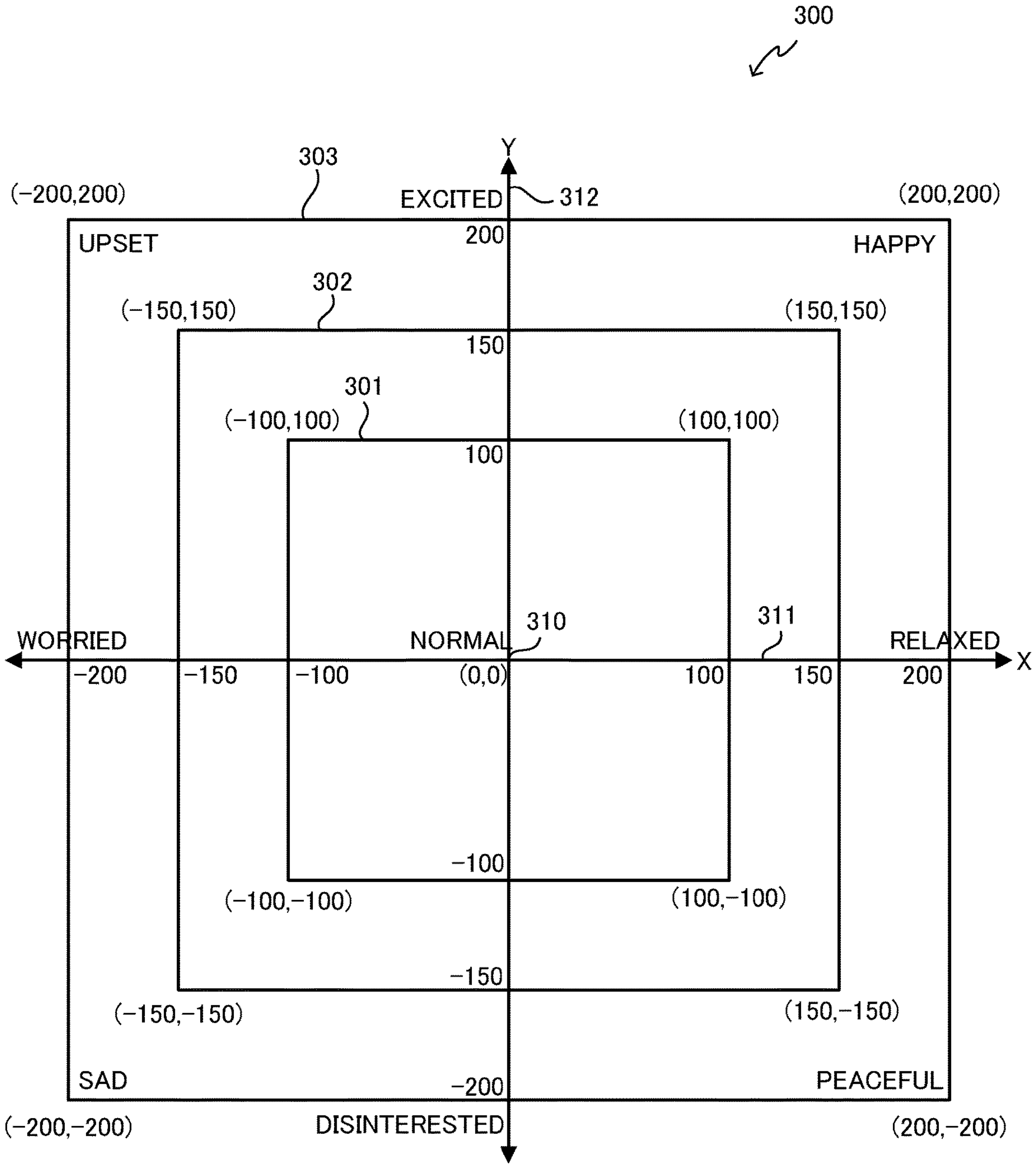
FIG. 5 is a drawing for explaining an example of an emotion map according to Embodiment 1.

The emotion data 121 is data for imparting pseudo-emotions to the robot 200, and is data (X, Y) that represents coordinates on an emotion map 300. As illustrated in FIG. 5, the emotion map 300 is expressed by a two-dimensional coordinate system with a degree of relaxation (degree of worry) axis as an X axis 311, and a degree of excitement (degree of disinterest) axis as a Y axis 312. An origin 301 (0, 0) on the emotion map 300 represents an emotion when normal. Moreover, as the value of the X coordinate (X value) is positive and the absolute value thereof increases, emotions for which the degree of relaxation is high are expressed and, as the value of the Y coordinate (Y value) is positive and the absolute value thereof increases, emotions for which the degree of excitement is high are expressed. Additionally, as the X value is negative and the absolute value thereof increases, emotions for which the degree of worry is high are expressed and, as the Y value is negative and the absolute value thereof increases, emotions for which the degree of disinterest is high are expressed.

The emotion data 121 has two values, namely the X value (degree of relaxation, degree of worry) and the Y value (degree of excitement, degree of disinterest) that express a plurality (in the present embodiment, four) of mutually different pseudo-emotions, and points on the emotion map 300 represented by the X value and the Y value represent the pseudo-emotions of the robot 200. An initial value of the emotion data 121 is (0, 0). The emotion data 121 is a parameter expressing a pseudo-emotion of the robot 200 and, as such, is also called an "emotion parameter." Note that, in FIG. 5, the emotion map 300 is expressed as a two-dimensional coordinate system, but the number of dimensions of the emotion map 300 may be set as desired. For example, a configuration is possible in which the emotion map 300 is defined by one dimension, and one value is set as the emotion data 121. Additionally, a configuration is possible in which another axis is added and the emotion map 300 is defined by three or more dimensions, and a number of values corresponding to the number of dimensions of the emotion map 300 are set as the emotion data 121.

In the present embodiment, regarding the size of the emotion map 300 as the initial value, as illustrated by frame 301 of FIG. 5, a maximum value of both the X value and the Y value is 100 and a minimum value is −100. Moreover, during a first period, each time the pseudo growth days count of the robot 200 increases one day, the maximum value and the minimum value of the emotion map 300 both increase by two. Here, the first period is a period in which the robot 200 grows in a pseudo manner, and is, for example, a period of 50 days from a pseudo birth of the robot 200. Note that the pseudo birth of the robot 200 is the time of the first start up by the user of the robot 200 after shipping from the factory. When the growth days count is 25 days, as illustrated by frame 302 of FIG. 5, the maximum value of the X value and the Y value is 150 and the minimum value is −150. Moreover, when the first period elapses (in this example, 50 days), the pseudo growth of the robot 200 ends and, as illustrated in frame 303 of FIG. 5, the maximum value of the X value and the Y value is 200, the minimum value is −200, and the size of the emotion map 300 is fixed.

The emotion change data 122 is data that sets an amount of change that each of an X value and a Y value of the emotion data 121 is increased or decreased. In the present embodiment, as emotion change data 122 corresponding to the X of the emotion data 121, DXP that increases the X value and DXM that decreases the X value are provided and, as emotion change data 122 corresponding to the Y value of the emotion data 121, DYP that increases the Y value and DYM that decreases the Y value are provided. Specifically, the emotion change data 122 includes the following four variables. These variables are parameters that change the pseudo-emotion of the robot 200 and, as such, are also called "emotion change parameters."

DXP: Tendency to relax (tendency to change in the positive value direction of the X value on the emotion map)

DXM: Tendency to worry (tendency to change in the negative value direction of the X value on the emotion map)

DYP: Tendency to be excited (tendency to change in the positive value direction of the Y value on the emotion map)

DYM: Tendency to be disinterested (tendency to change in the negative value direction of the Y value on the emotion map)

In the present embodiment, an example is described in which the initial value of each of these variables is set to 10 and, during robot control processing, described below, the value increases to a maximum of 20 by processing for learning emotion change data. Due to this learning processing, the emotion change data 122, that is, the degree of change of emotion changes and, as such, the robot 200 assumes various personalities in accordance with the manner in which the user interacts with the robot 200. That is, the personality of each individual robot 200 is formed differently on the basis of the manner in which the user interacts with the robot 200.

Figure 6:
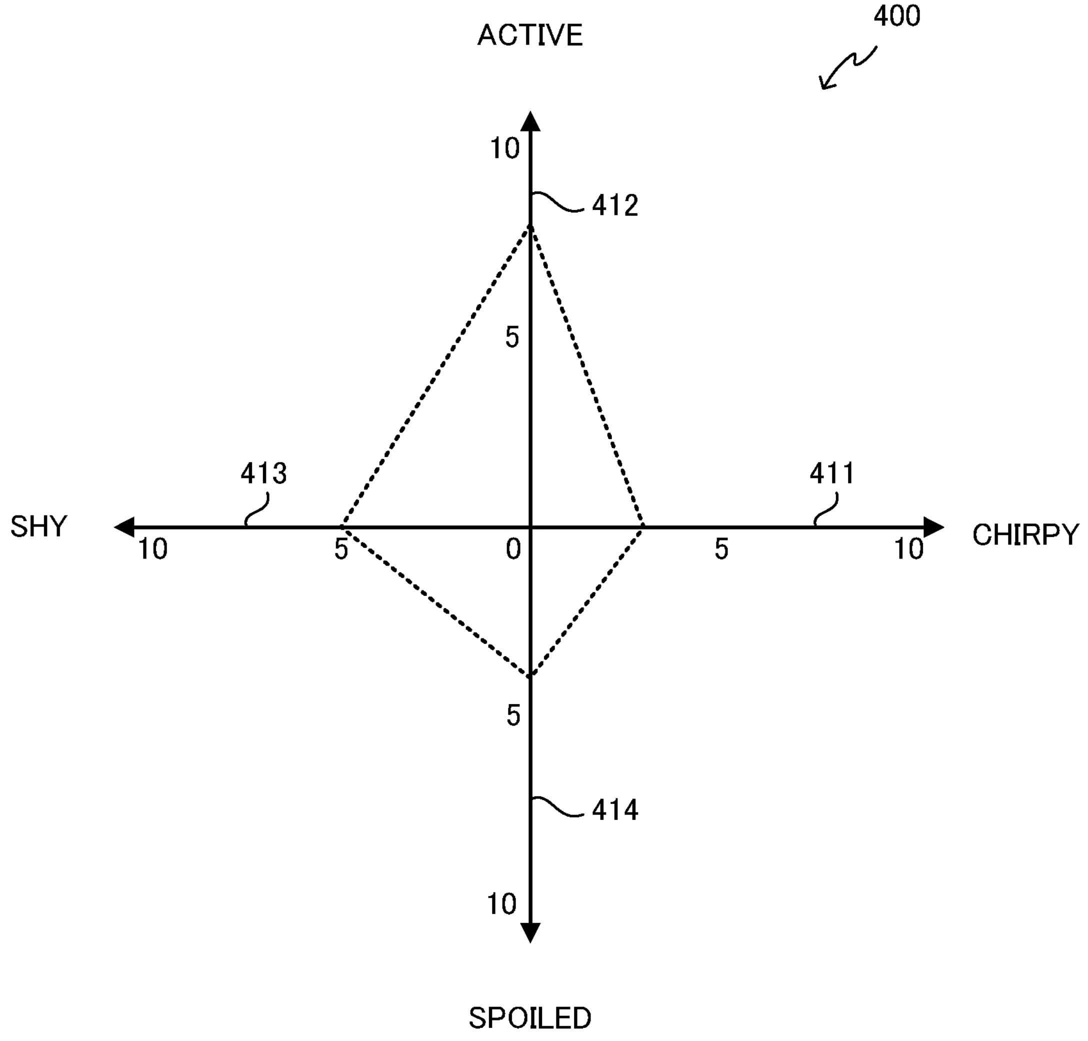
FIG. 6 is a drawing for explaining an example of a personality value radar chart according to Embodiment 1.

In the present embodiment, each piece of personality data (personality value) is derived by subtracting 10 from each piece of emotion change data 122. Specifically, a value obtained by subtracting 10 from DXP that expresses a tendency to be relaxed is set as a personality value (chirpy), a value obtained by subtracting 10 from DXM that expresses a tendency to be worried is set as a personality value (shy), a value obtained by subtracting 10 from DYP that expresses a tendency to be excited is set as a personality value (active), and a value obtained by subtracting 10 from DYM that expresses a tendency to be disinterested is set as a personality value (spoiled). As a result, for example, as illustrated in FIG. 6, it is possible to generate a personality value radar chart 400 by plotting each of the personality value (chirpy) on axis 411, the personality value (active) on axis 412, the personality value (shy) on axis 413, and the personality value (spoiled) on axis 414. Thus, the values of the emotion change parameters (emotion change data 122) can be said to express the pseudo personality of the robot 200.

Furthermore, in the present embodiment, the emotion change data 122, that is, the degree of change of emotion also changes due to a degree of familiarity (value expressing a degree of familiarity indicating how familiar the external stimulus is to the robot 200) acquired during the robot control processing described below. As such, the robot 200 can perform actions that take the manner in which the user has interacted with the robot 200 in the past into consideration.

The growth days count data 123 has an initial value of 1, and 1 is added for each passing day. The growth days count data 123 represents a pseudo growth days count (number of days from a pseudo birth) of the robot 200. Here, a period of the growth days count expressed by the growth days count data 123 is called a "second period."

As illustrated in FIG. 7, control conditions and control data are associated and stored in the control content table 124. When a control condition is satisfied (for example, some sort of external stimulus is detected), the controller 110 controls the driver 220 and the sound outputter 230 on the basis of the corresponding control data (motion data for expressing an action by the driver 220, and sound effect data for outputting a sound effect from the sound outputter 230).

As illustrated in FIG. 7, the motion data is a series of sequence data for controlling the driver 220 (arranged as "Time (ms): Rotational angle (angle) of vertical motor 222: Rotational angle (angle) of twist motor 221"). For example, when the body is petted, the controller 110 and the driver 220 are controlled so that, firstly (at 0 sec), the rotational angles of the vertical motor 222 and the twist motor 221 are set to 0 degrees (vertical reference angle and twist reference angle), at 0.5 sec, the head 204 is raised so that the rotational angle of the vertical motor 222 becomes 60 degrees, and at 1 sec, the head 204 is twisted so that the rotational angle of the twist motor 221 becomes 60 degrees.

Regarding the sound effect data, to facilitate ease of understanding, text describing each piece of the sound effect data is included in FIG. 7, but in actuality, the sound effect data (sampled sound data) described by the text itself is stored in the control content table 124 as the sound effect data. Additionally, a value representing a desinence position is included in the sound effect data (for example, "Desinence: 30%"). This value is obtained by expressing the desinence position as a percentage from the beginning of the length of the entire sound effect data, and is used when changing a tone of a sound effect (changing the frequency of the desinence) in control data change/playback processing, described later.

Note that, in the control content table 124 illustrated in FIG. 7, a condition related to emotion (expressed by the coordinates on the emotion map 300) is not included in the control condition, but a configuration is possible in which a condition related to emotion is included in the control condition, and the control data is changed in accordance with the emotion.

Figure 8:
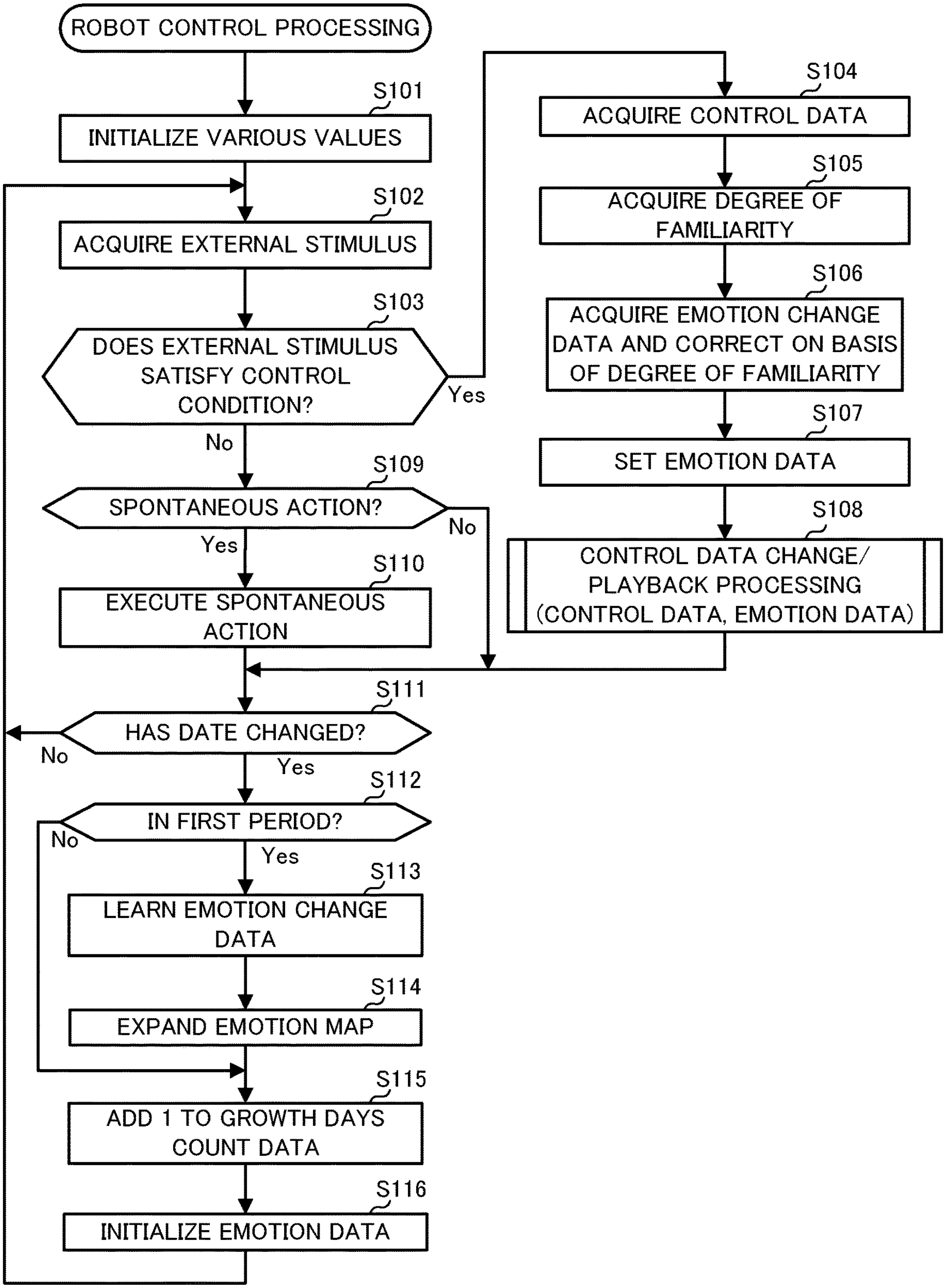
FIG. 8 is a flowchart illustrating the flow of robot control processing according to Embodiment 1.

Next, the robot control processing executed by the controller 110 of the apparatus control device 100 is described while referencing the flowchart illustrated in FIG. 8. The robot control processing is processing in which the apparatus control device 100 controls the actions, sound, and the like of the robot 200 on the basis of the detection values from the external stimulus detector 210 or the like. The robot control processing starts when the user turns ON the power of the robot 200.

Firstly, the controller 110 initializes the various types of data such as the emotion data 121, the emotion change data 122, the growth days count data 123, and the like (step S101). Note that, a configuration is possible in which, for the second and subsequent startups of the robot 200, the various values from when the power of the robot 200 was last turned OFF are set in step S101. This can be realized by the controller 110 storing the various data values in nonvolatile memory (flash memory or the like) of the storage 120 when an operation for turning the power OFF is performed the last time and, when the power is thereafter turned ON, setting the stored values as the various data values.

Next, the controller 110 acquires an external stimulus detected by the external stimulus detector 210 (step S102). Then, the controller 110 determines whether there is a control condition, among the control conditions defined in the control content table 124, that is satisfied by the external stimulus acquired in step S102 (step S103).

When any of the control conditions defined in the control content table 124 is satisfied by the acquired external stimulus (step S103; Yes), the controller 110 references the control content table 124 and acquires the control data corresponding to the control condition that is satisfied by the acquired external stimulus (step S104).

Then, the controller 110 acquires the degree of familiarity on the basis of the external stimulus acquired in step S102 and history information about external stimuli that have been acquired in the past (step S105). The degree of familiarity is a parameter that is used to generate a phenomenon whereby, when the robot 200 is repeatedly subjected to the same external stimulus, the robot 200 gets used to that stimulus and the emotion does not significantly change. In the present embodiment, the degree of familiarity is a value from 1 to 10. Any method can be used to acquire the degree of familiarity. For example, the controller 110 can acquire the degree of familiarity by the method described in Unexamined Japanese Patent Application Publication No. 2021-153680.

Next, the controller 110 acquires the emotion change data 122 in accordance with the external stimulus acquired in step S102, and corrects the emotion change data 122 on the basis of the degree of familiarity (step S106). Specifically, when, for example, petting of the head 204 is detected by the touch sensor 211 of the head 204 as the external stimulus, the robot 200 obtains a pseudo sense of relaxation and, as such, the controller 110 acquires DXP as the emotion change data 122 to be added to the X value of the emotion data 121. Then, the controller 100 divides DXP of the emotion change data 122 by the value of the degree of familiarity. Due to this, as the value of the degree of familiarity increases, the value of the emotion change data 122 decreases and the pseudo-emotion is less likely to change.

Moreover, the controller 110 sets the emotion data 121 in accordance with the emotion change data 122 acquired (and corrected) in step S106 (step S107). Specifically, when, for example, DXP is acquired as the emotion change data 122 in step S106, the controller 110 adds the corrected DXP of the emotion change data 122 to the X value of the emotion data 121.

In steps S106 and S107, any type of settings are possible for the type of emotion change data 122 acquired (and corrected) and the emotion data 121 set for each individual external stimulus. Examples are described below.

The head 204 is petted (relax): $X=X+DXP$/degree of familiarity

The head 204 is struck (worry): $X=X-DXM$/degree of familiarity (these external stimuli can be detected by the touch sensor 211 of the head 204)

The torso 206 is petted (excite): $Y=Y+DYP$/degree of familiarity

The torso 206 is struck (disinterest): $Y=Y-DYM$/degree of familiarity (these external stimuli can be detected by the touch sensor 211 of the torso 206)

Held with head upward (happy): $X=X+DXP$/degree of familiarity, and $Y=Y+DYP$/degree of familiarity Suspended with head downward (sad): $X=X-DXM$/degree of familiarity, and $Y=Y-DYM$/degree of familiarity (these external stimuli can be detected by the touch sensor 211, the acceleration sensor 212, and the gyrosensor 214)

Spoken to in kind voice (peaceful): $X=X+DXP$/degree of familiarity, and $Y=Y-DYM$/degree of familiarity Yelled out in loud voice (upset): $X=X-DXM$/degree of familiarity, and $Y=Y+DYP$/degree of familiarity (these external stimuli can be detected by the microphone 213)

However, in a case in which a value (X value, Y value) of the emotion data 121 exceeds the maximum value of the emotion map 300 when adding the emotion change data 122, that value of the emotion data 121 is set to the maximum value of the emotion map 300. In addition, in a case in which a value of the emotion data 121 is less than the minimum value of the emotion map 300 when subtracting the emotion change data 122, that value of the emotion data 121 is set to the minimum value of the emotion map 300.

Moreover, the controller 110 executes control data change/playback processing with the control data acquired in step S104 and the emotion data 121 set in step S107 as arguments (step S108), and executes step S111. The control data change/playback processing is processing in which the control data acquired in step S104 is adjusted (changed) in accordance with the emotion data 121 set in step S107, and the robot 200 is controlled. This control data change/playback processing is described in detail later. Note that, when the emotion change data 122 is corrected in step S106, after step S108 ends, the controller 110 returns the emotion change data 122 to the uncorrected state.

Meanwhile, when, in step S103, none of the control conditions defined in the control content table 124 are satisfied by the acquired external stimulus (step S103; No), the controller 110 determines whether to perform a spontaneous action such as a breathing action or the like (step S109). Any method may be used as the method for determining whether to perform the spontaneous action but, in the present embodiment, it is assumed that the determination of step S109 is Yes and the breathing action is performed every breathing cycle (for example, two seconds).

When not performing the spontaneous action (step S109; No), the controller 110 executes step S111. When performing the spontaneous action (step S109; Yes), the controller 110 executes the spontaneous action (for example, a breathing action) (step S110), and executes step S111.

The control data of this spontaneous action also is stored in the control content table 124 (such as illustrated in, for example, "breathing cycle elapsed" of the "control conditions" of FIG. 7). While omitted from FIG. 8, in step S110 as well, the control data may be adjusted (changed) on the basis of the emotion data in the same manner as the processing executed when there is an external stimulus (for example, the processing of steps S105 to S108).

In step S111, the controller 110 uses the clock function to determine whether a date has changed. When the date has not changed (step S111; No), the controller 110 executes step S102.

When the date has changed (step S111; Yes), the controller 110 determines whether it is in a first period (step S112). When the first period is, for example, a period 50 days from the pseudo birth (for example, the first startup by the user after purchase) of the robot 200, the controller 110 determines that it is in the first period when the growth days count data 123 is 50 or less. When it is not in the first period (step S112; No), the controller 110 executes step S115.

When it is in the first period (step S112; Yes), the controller 110 performs learning of the emotion change data 122 (step S113). Specifically, the learning of the emotion change data 122 is adding 1 to the DXP of the emotion change data 122 when the X value of the emotion data 121 is set to the maximum value of the emotion map 300 even once in step S107 of that day. The learning of the emotion change data 122 is adding 1 to the DYP of the emotion change data 122 when the Y value of the emotion data 121 is set to the maximum value of the emotion map 300 even once. The learning of the emotion change data 122 is adding 1 to the DXM of the emotion change data 122 when the X value of the emotion data 121 is set to the minimum value of the emotion map 300 even once. The learning of the emotion change data 122 is adding 1 to the DYM of the emotion change data 122 when the Y value of the emotion data 121 is set to the minimum value of the emotion map 300 even once. The emotion change data 122 is learned and updated as a result of the addition processing described above.

Note that, when the various values of the emotion change data 122 become exceedingly large, the amount of change of one time of the emotion data 121 becomes exceedingly large and, as such, the maximum value of the various values of the emotion change data 122 is set to 20, for example, and the various values are limited to that maximum value or less. Here, 1 is added to each piece of the emotion change data 122, but the value to be added is not limited to 1. For example, a configuration is possible in which a number of times at which the various values of the emotion data 121 are set to the maximum value or the minimum value of the emotion map 300 is counted and, when that number of times is great, the numerical value to be added to the emotion change data 122 is increased.

Returning to FIG. 8, next, the controller 110 expands the emotion map 300 (step S114). Expanding the emotion map 300 is, specifically, processing in which the controller 110 expands both the maximum value and the minimum value of emotion map 300 by 2. However, the numerical value "2" to be expanded is merely an example, and the emotion map 300 may be expanded by 3 or greater, or be expanded by 1. Additionally, a configuration is possible in which the numerical value that the emotion map 300 is expanded differs by axis or is different for the maximum value and the minimum value.

In FIG. 8, the learning of the emotion change data 122 and the expanding of the emotion map 300 are performed after the controller 110 determines that the date has changed in step S111, but a configuration is possible in which the learning of the emotion change data 122 and the expanding of the emotion map 300 are performed after a determination is made that a reference time (for example, 9:00 PM) has arrived. Moreover, a configuration is possible in which the determination in step S111 is not a determination based on the actual date, but is a determination performed on the basis of a value obtained by accumulating, by the timer function of the controller 110, an amount of time that the robot 200 has been turned ON. For example, a configuration is possible in which every time a cumulative amount of time that the power is ON is an amount of time that is a multiple of 24, the robot 200 is regarded as having grown one day, and the learning of the emotion change data 122 and the expanding of the emotion map 300 are carried out.

Returning to FIG. 8, next, the controller 110 adds 1 to the growth days count data 123 (step S115), initializes both the X value and the Y value of the emotion data to 0 (step S116), and executes step S102. Note that, when it is desirable that the robot 200 carries over the pseudo-emotion of the previous day to the next day, the controller 110 executes step S102 without executing the processing of step S116.

Figure 9:
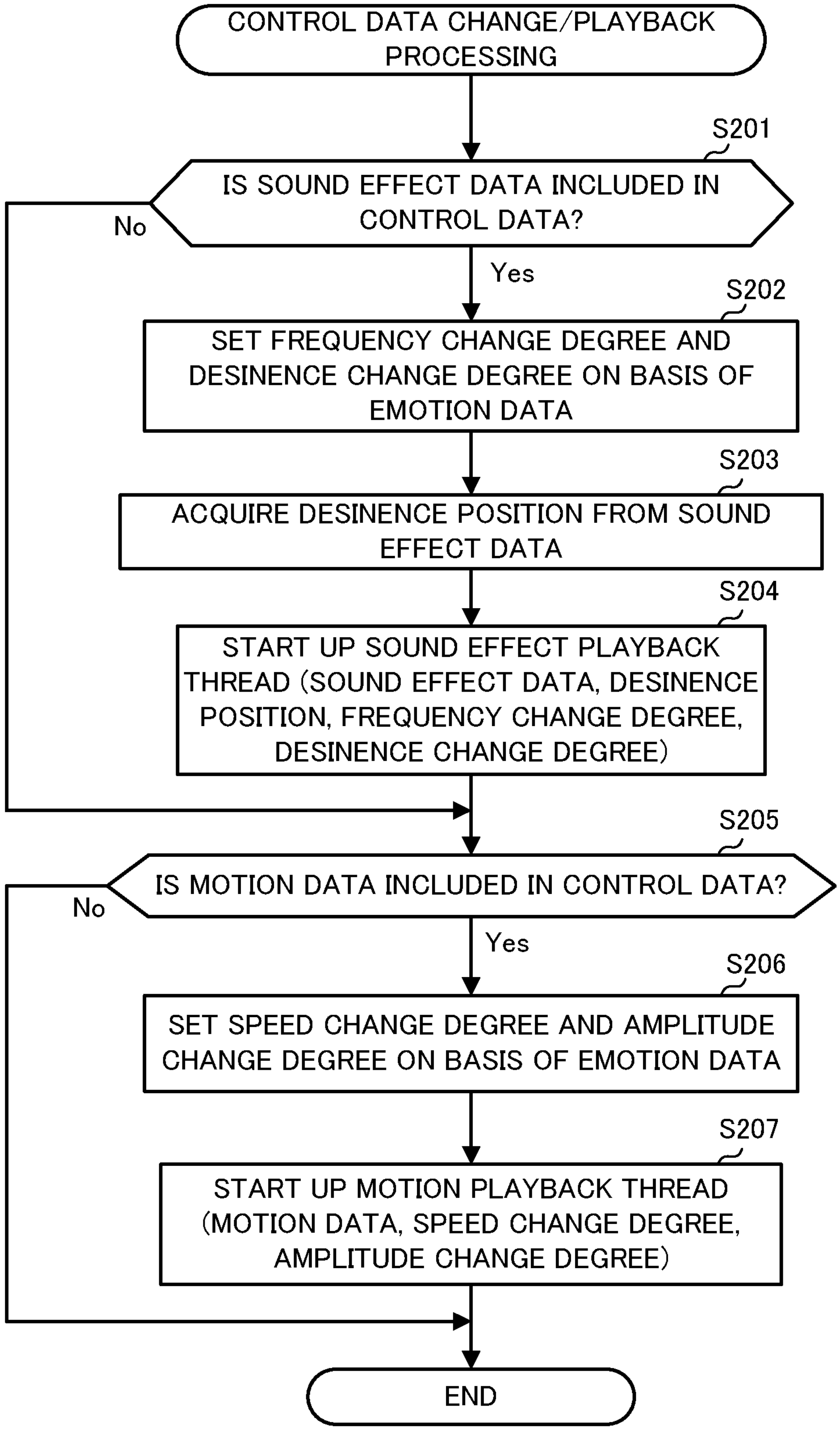
FIG. 9 is a flowchart illustrating the flow of control data change/playback processing according to Embodiment 1.

Next, the control data change/playback processing in which, in step S108 of the robot control processing described above, the control data and the emotion data 121 are called as arguments is described while referencing FIG. 9.

Firstly, the controller 110 determines whether the sound effect data is included in the control data (step S201). When the sound effect data is not included (step S201; No), step S205 is executed.

When the sound effect data is included (step S201; Yes), the controller 110 sets a frequency change degree and a desinence change degree on the basis of the emotion data 121 (step S202). Specifically, the frequency change degree is set to a value obtained by dividing the X value of the emotion data 121 by 10, and the desinence change degree is set to a value obtained by dividing the Y value of the emotion data 121 by 10. That is, the frequency change degree and the desinence change degree are both set to values from −30 to 30.

Next, the controller 110 acquires the desinence position from the sound effect data (step S203). As illustrated in FIG. 7, the desinence position is recorded in the control content table 124 for every piece of sound effect data and, as such, the controller 110 can acquire the desinence position from the sound effect data.

Then, the controller 110 starts up a sound effect playback thread, described later, with the sound effect data, the desinence position, the frequency change degree, and the desinence change degree as arguments (step S204), and executes step S205. The sound effect playback thread is described later in detail but, in this thread, the sound effect is output from the sound outputter 230 by the sound effect data adjusted (changed) on the basis of the emotion data.

In step S205, the controller 110 determines whether the motion data is included in the control data. When the motion data is not included in the control data (step S205; No), the controller 110 ends the control data change/playback processing.

When the motion data is included in the control data (step S205; Yes), the controller 110 sets a speed change degree and an amplitude change degree on the basis of the emotion data 121 (step S206). Specifically, the speed change degree is set to a value obtained by dividing the X value of the emotion data 121 by 10, and the amplitude change degree is set to a value obtained by dividing the Y value of the emotion data 121 by 10. That is, the speed change degree and the amplitude change degree are both set to values from −30 to 30.

Then, the controller 110 starts up a motion playback thread, described later, with the motion data, the speed change degree, and the amplitude change degree as arguments (step S207), and ends the control data change/playback processing. The motion playback thread is described later in detail but, in this thread, the driver 220 is driven by the motion data adjusted (changed) on the basis of the emotion data 121 and, as a result, an action of the robot 200 is expressed.

Figure 10:
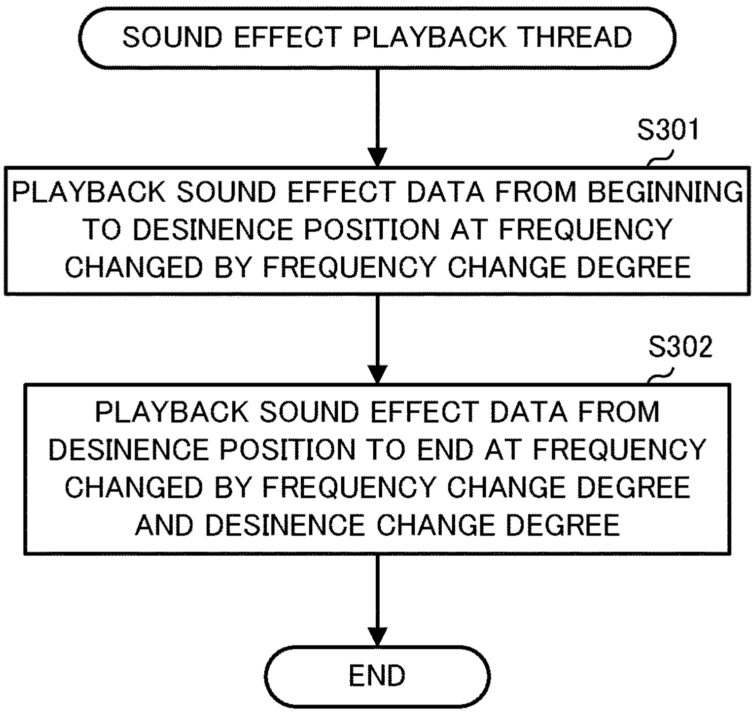
FIG. 10 is a flowchart illustrating the flow of processing of a sound effect playback thread according to Embodiment 1.

Next, the sound effect playback thread called in step S204 of the control data change/playback processing (FIG. 9) is described while referencing FIG. 10. This processing is executed in parallel with the control data change/playback processing of the caller.

Firstly, the controller 110 uses the sound outputter 230 to playback from the beginning to the desinence position of the sound effect data at a frequency changed by the frequency change degree (step S301). Any method may be used to change the frequency. For example, the frequency may be changed by changing a playback speed in accordance with the frequency change degree. In one example, when the frequency change degree is 10, the frequency is raised 10% by speeding up the playback speed 10% from a normal speed.

Next, the controller 110 uses the sound outputter 230 to playback from the desinence position to the end of the sound effect data at a frequency changed by the frequency change degree and the desinence change degree (step S302), and ends the sound effect playback thread. Any method may be used to change the frequency by the frequency change degree and the desinence change degree. For example, the frequency may be changed on the basis of a value obtained by summing these two change degrees, or the frequency may be changed by the frequency change degree and then further changed by the desinence change degree. When the frequency change degree is 10 and the desinence change degree is 5, in the method of the former, that is, when changing on the basis of a value obtained by summing the frequency change degree and the desinence change degree, the frequency is raised 15% (10+5=15). In the method of the latter, that is, when changing the frequency by the frequency change degree and then further changing the frequency by the desinence change degree, the frequency is raised 15.5% (1.1×1.05=1.155). In such a case, the controller 110 may raise the frequency by increasing the playback speed.

Figure 11:
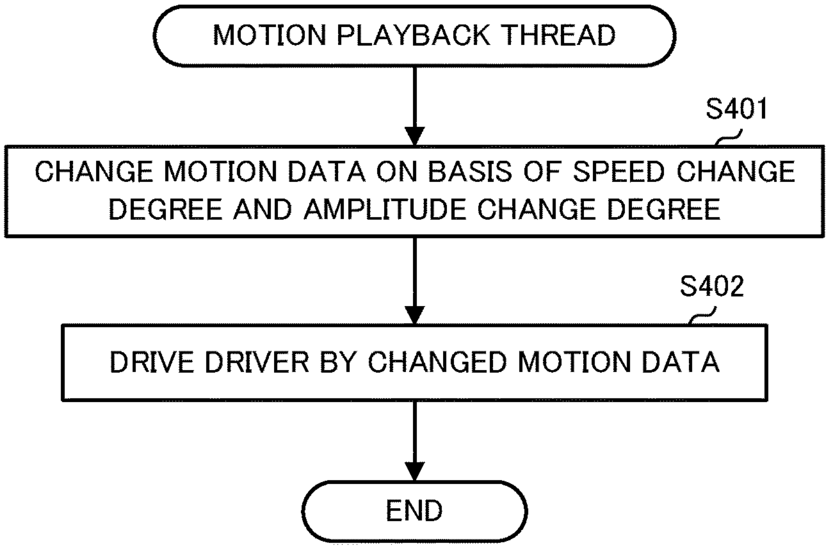
FIG. 11 is a flowchart illustrating the flow of processing of a motion playback thread according to Embodiment 1.

Next, the motion playback thread called in step S207 of the control data change/playback processing (FIG. 9) is described while referencing FIG. 11. This processing is executed in parallel with the control data change/playback processing of the caller.

Firstly, the controller 110 changes the motion data on the basis of the speed change degree and the amplitude change degree (step S401). More specifically, time data of the motion data is multiplied by (100/(100+speed change degree)), and rotational angle data is multiplied by ((100+amplitude change degree)/100). In one example, when the speed change degree is −10, the speed is reduced 10% by multiplying the time data of the motion data by 100/(100−10) and, when the amplitude change degree is 10, the rotational angle is increased 10% by multiplying the rotational angle data by (100+10)/100.

However, when the changed motion data exceeds the limits of the driver 220, the motion data may be changed so as to be in the range that does not exceed those limits. Additionally, a configuration is possible in which the motion data in the control content table 124 is set, in advance, to values whereby the limits of the driver 220 are not exceeded even when the speed and/or the amplitude is increased +30%.

Then, the controller 110 drives the driver 220 on the basis of the motion data changed in step S401 (step S402), and ends the motion playback thread.

As a result of the control data change/playback processing described above, the control data is changed on the basis of the emotion data 121. Accordingly, the robot 200 can perform actions corresponding to emotions (output sound effects from the sound outputter 230, make gestures by the driver 220) without control data being specifically stored for every pseudo-emotion (piece of emotion data 122) of the robot 200. Specifically, even for pieces of the control data for which the sound effect or the same gesture are the same, the frequency and the up-down (tone) of the desinence in the case of sound effects, and the speed and amplitude of the action in the case of gestures are respectively adjusted (changed) on the basis of the coordinates of the emotion on the emotion map 300 at that time and, as a result, sound effects and gestures corresponding to emotions can be expressed. Accordingly, the robot 200 can be made to act in a more emotionally abundant manner than in the conventional technology, even though the amount of control data is the same.

Note that, in the control data change/playback processing described above, when the control data is a sound effect, the controller 110 adjusts (changes) the frequency and/or the up-down (tone) of the desinence on the basis of the emotion data 121. However, the present disclosure is not limited to the frequency and/or the tone of the sound effect being adjusted. A configuration is possible in which the controller 110 controls so as to adjust (change) an amount of output time of the sound effect, for example, on the basis of the emotion data 121.

In the control data change/playback processing described above, the controller 110 adjusts the control data on the basis of the emotion data 121. However, a configuration is possible in which the controller 110 adjusts the control data on the basis of the emotion change data 122 in addition to the emotion data 121 or instead of the emotion data 121.

In one example, in step S202 described above, the change degrees of the sound effect data are set with the frequency change degree=X/10 and the desinence change degree=Y/10. However, a configuration is possible in which the controller 110 sets these change degrees using the emotion change data 122. For example, the following settings are possible.

$$\text{Frequency change degree}=(X+(DXP-10)-(DXM-10))/10$$

$$\text{Desinence change degree}=(Y+(DYP-10)-(DYM-10))/10$$

In step S206 described above, the change degrees of the motion data are set with the speed change degree=X/10 and the amplitude change degree=Y/10.

However, a configuration is possible in which the controller 110 sets these change degrees using the emotion change data 122. For example, the following settings are possible.

$$\text{Speed change degree}=(X+(DXP-10)-(DXM-10))/10$$

$$\text{Amplitude change degree}=(Y\pm(DYP-10)-(DYM-10))/10$$

Note that the emotion change data 122 takes a value from 10 to 20 and, as such, in the equations described above, each of (DXP, DXM, DYP, and DYM) is reduced by 10 to set the value in a range from 0 to 10 and, then, the calculation is carried out.

In the example described above, the controller 110 adjusts (changes) the sound effect data and the motion data on the basis of only the emotion data 121 (emotion) or on the basis of both the emotion data 121 (emotion) and the emotion change data 122 (personality). However, a configuration is possible in which the controller 110 adjusts (changes) the sound effect data and/or the motion data on the basis of only the emotion change data 122 (personality).

Embodiment 2

A case is considered in which, the robot 200 is configured to output a sound effect such as "AHHHH!" from the sound outputter when the robot 200 detects an abnormality such as falling or the like. In such a case, it is desirable that the sound effect be continuously output in a period in which the abnormality is continuing in order to more clearly notify the user of the abnormality. Embodiment 2, which enables such, is described next.

Figure 12:
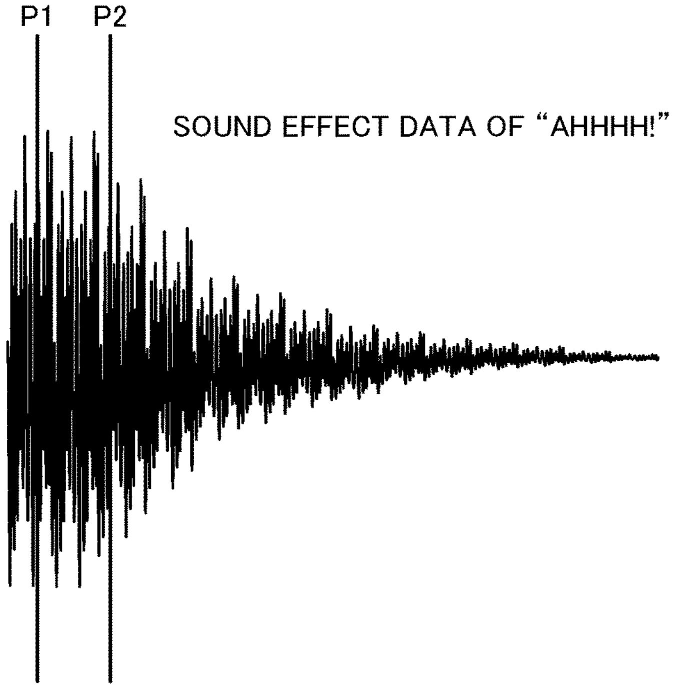
FIG. 12 is a drawing for explaining an example of sound effect data according to Embodiment 2.

The functional configuration and the structure of the robot 200 according to Embodiment 2 are the same as in Embodiment 1 and, as such, description thereof is omitted. However, control content for cases in which an abnormality is detected is stored in the control content table 124 according to Embodiment 2. Specifically, a condition of an external stimulus for which an abnormality is detected is defined as the control condition, and sound effect data of a sound effect to be output when the abnormality is detected is stored as the control data. Moreover, as illustrated in FIG. 12, information about a repeat position P1 and a repeat position P2 is also stored in the stored sound effect data.

Figure 13:
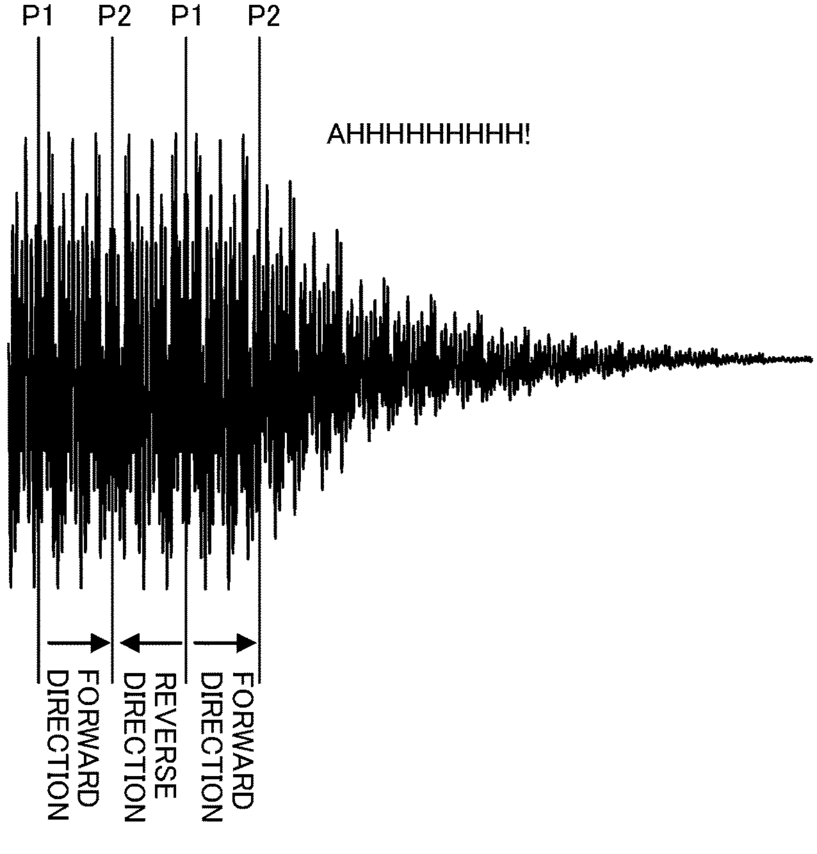
FIG. 13 is a drawing for explaining an example of a situation in which a sound effect is lengthened by a sound effect lengthening thread according to Embodiment 2.

As described later, the controller 110 lengthens the sound effect by repeatedly playing back the data that is from the repeat position P1 to the repeat position P2. However, in many cases, an amplitude value at P1 of the sound effect data differs from an amplitude value at P2 of the sound effect data and, as such, when the data that is from P1 to P2 is simply repeated, a step are generated in the waveform of the speech output at the transitions of the repeating data due to the difference between the amplitude values at P1 and P2, and an unnatural sound is produced. As such, in Embodiment 2, as illustrated in FIG. 13, after playing back from P1 to P2 in a forward direction, from P2 to P1 is played back in a reverse direction to prevent the generation of steps in the waveform at the transitions of the repeating data.

Note that, although it is possible to prevent the generation of the steps in the waveform at the transitions of the repeating data by playing back from P1 to P2 in a back-and-forth manner, the slope of the waveform at these transitions may change rapidly. Moreover, these rapid changes in the slope of the waveform at the transitions may negatively affect the sound. Accordingly, when setting the repeat positions P1 and P2, a creator of the sound effect data may set the repeat positions P1 and P2 after actually playing back from P1 to P2 in a back-and-forth manner to confirm that there is no unnaturalness and, then, store the resulting data in the control content table 124 as the sound effect data.

When a sound effect is lengthened without playing back from the repeat position P1 to the repeat position P2 in a back-and-forth manner (when a sound effect is lengthened by repeating playback from the repeat position P1 to the repeat position P2 in the forward direction), it is necessary to adjust not only the slope, but also the amplitude at the transitions of the repetitions. However, the amplitude reliably matches as a result of performing the back-and-forth playback. Accordingly, by playing back, in a back-and-forth manner, the portion from the repeat position P1 to the repeat position P2 in the forward direction and the reverse direction, it is possible to remarkably reduce the work of setting the repeat positions P1 and P2 compared to when not performing the back-and-forth playback.

Figure 14:
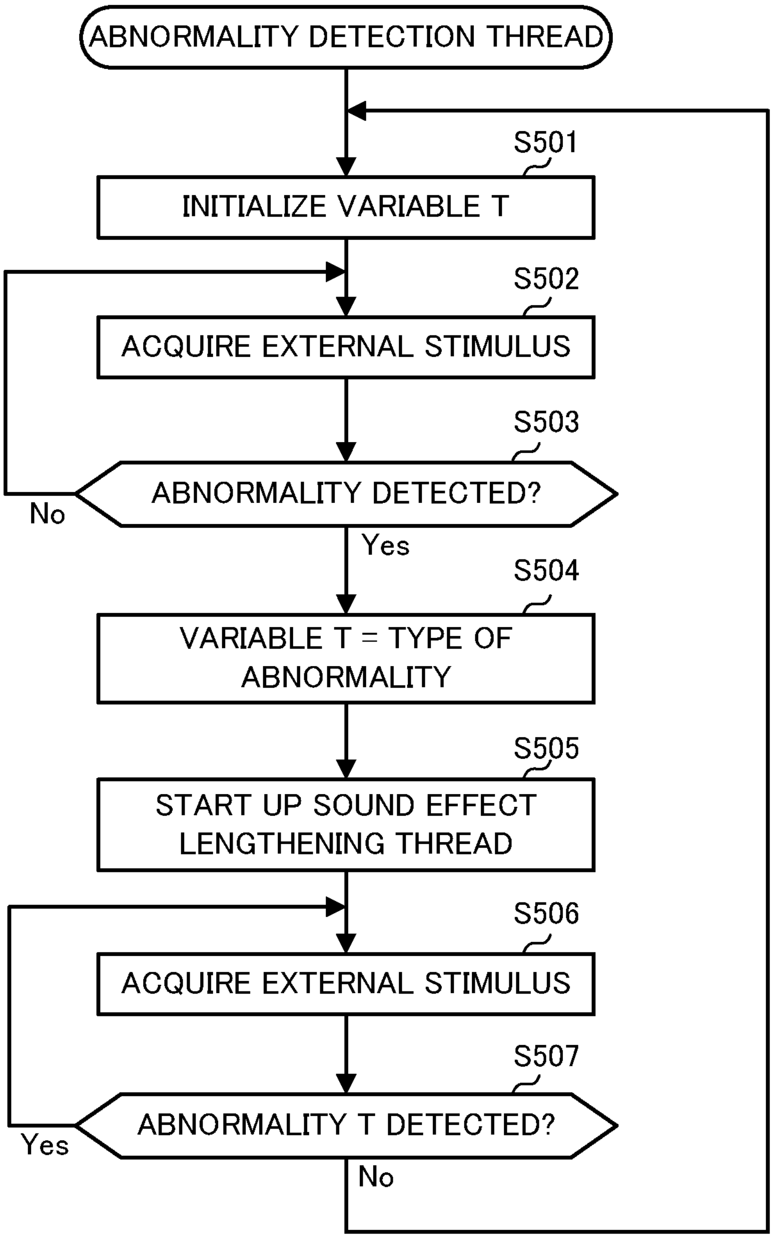
FIG. 14 is a flowchart illustrating the flow of processing of an abnormality detection thread according to Embodiment 2.

In Embodiment 2, processing for detecting an abnormality such as falling or the like is executed and, as such, an abnormality detection thread is described while referencing FIG. 14. Execution of the abnormality detection thread is started in parallel with the other processings (the robot control processing and the like described above) when the user turns ON the power of the robot 200. Note that the value of a variable T used in the abnormality detection thread can also be referenced from a sound effect lengthening thread, described later.

Firstly, the controller 110 initializes the value of the variable T that stores the type of the abnormality (step S501). The value of the variable T at the time of initialization can be any value that can express that there is no abnormality. For example, the value of the variable T at the time of initialization may be set to 0.

Next, the controller 110 acquires an external stimulus detected by the external stimulus detector 210 (step S502). Then, the controller 110 determines, on the basis of the acquired external stimulus, whether an abnormality is detected (step S503). Examples of the abnormality include the robot 200 falling, rolling, being picked up by the fur, being rotated, and the like. Each of these abnormalities can be detected on the basis of the acceleration and/or the angular velocity.

In one example, the controller 110 can determine that "the robot 200 is falling" when the sum of squares of the acceleration on each axis detected by the acceleration sensor is less than a falling threshold. Additionally, the controller 110 can determine that "the robot 200 is being rolled" when the value of the Y-axis angular velocity detected by the gyrosensor exceeds a rolling threshold. Moreover, the controller 110 can determine that "the robot 200 is being picked up by the fur" when the value of the Z-axis acceleration detected by the acceleration sensor exceeds a pick up threshold. Furthermore, the controller 110 can determine that "the robot 200 is being rotated" when the Z-axis angular velocity detected by the gyrosensor exceeds a rotation threshold.

When the controller 110 does note detect these abnormalities (step S503; No), step S502 is executed. When the controller 110 detects any of these abnormalities (step S503; Yes), the controller 110 stores the type (type such as "fall", "roll", or the like) of the detected abnormality in the variable T (step S504). In this step, the controller 110 stores a value associated with the type of abnormality in the variable T. For example, the controller 110 stores 1 for "fall", 2 for "roll", and the like in the variable T, Then, the controller 110 starts up a sound effect lengthening thread, described later (step S505). The sound effect lengthening thread is processing in which a sound effect corresponding to the type of the abnormality is lengthened for the period in which the abnormality is continuing. This processing is described later in detail.

Then, the controller 110 acquires the external stimulus again (step S506), and determines whether an abnormality of the type stored in the variable T is detected (step S507). When an abnormality of the type stored in the variable T is detected (step S507; Yes), step S506 is executed. When an abnormality of the type stored in the variable T is not detected (step S507; No), step S501 is executed.

Figure 15:
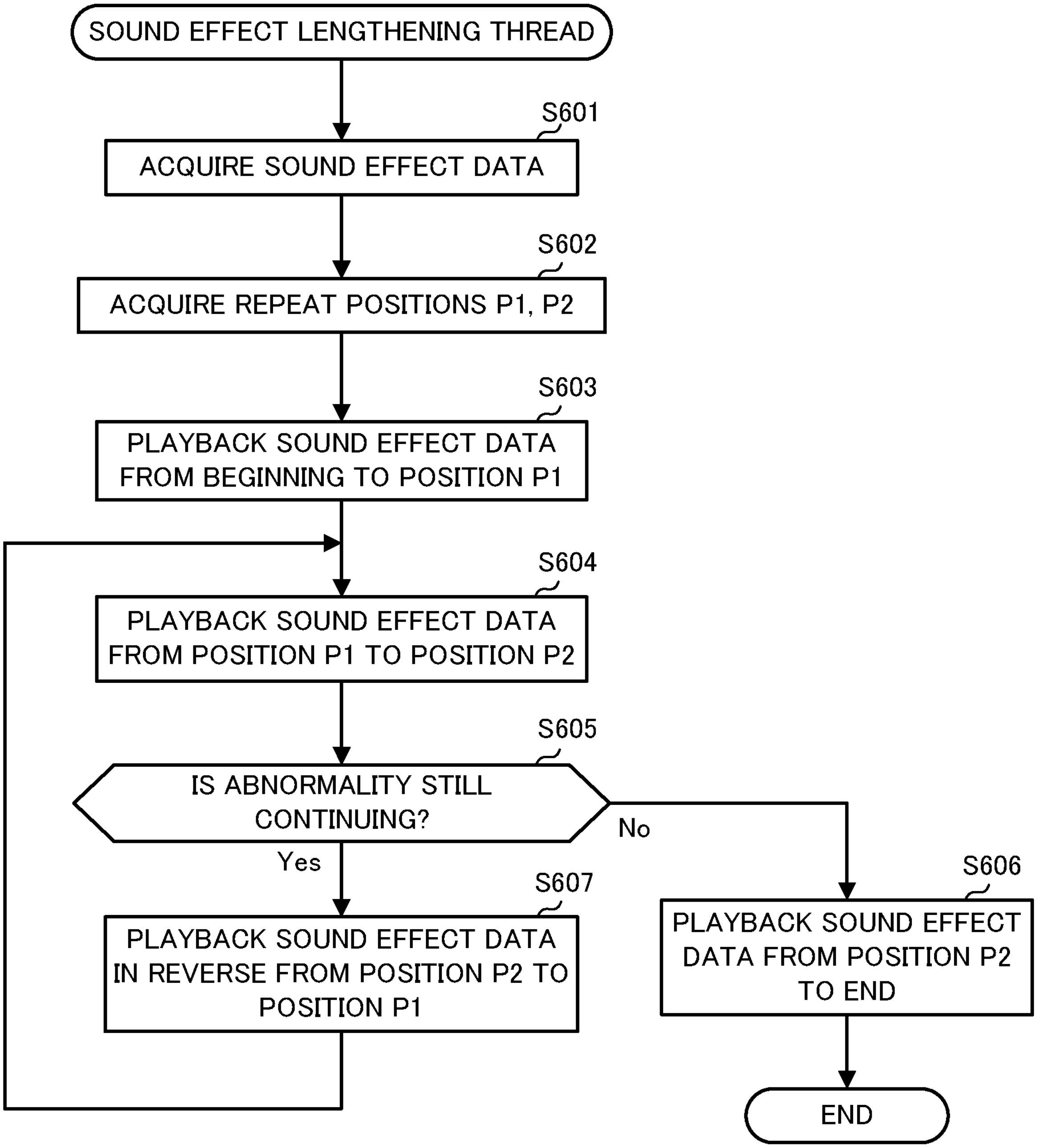
FIG. 15 is a flowchart illustrating the flow of processing of the sound effect lengthening thread according to Embodiment 2.

As a result of the abnormality detection thread described above, the type of the abnormality is stored in the variable T during the period in which the abnormality is being detected and, when the abnormality is no longer detected, the variable T is initialized. Next, the sound effect lengthening thread started up in step S505 of the abnormality detection thread (FIG. 14) is described while referencing FIG. 15.

Firstly, the controller 110 references the variable T and the control content table 124, acquires the sound effect data corresponding to the detected abnormality (step S601), and acquires the repeat positions P1 and P2 included in the sound effect data (step S602).

Next, the controller 110 plays back the sound effect data from the beginning to the position P1 by the sound outputter 230 (step S603), and further plays back from the position P1 to the position P2 in the forward direction (step S604).

Then, the controller 110 references the variable T, and determines whether the abnormality is still continuing, that is, whether the value of the variable T has not changed (has not been initialized) (step S605). When the abnormality is not continuing (step S605; No), the controller 110 plays back the sound effect data from the position P2 to the end by the sound outputter 230 (step S606), and ends the processing of the sound effect lengthening thread.

When the abnormality is continuing (step S605; Yes), the controller 110 plays back the sound effect data from the position P2 to the position P1 in the reverse direction by the sound outputter 230 (step S607), and executes step S604.

As a result of the sound effect lengthening thread described above, the robot 200 according to Embodiment 2 can, for the period in which the abnormality is being detected, lengthen and output a sound effect in a manner so as not to impart unnaturalness.

MODIFIED EXAMPLES

The present disclosure is not limited to the embodiments described above, and various modifications and uses are possible. For example, a configuration is possible in which Embodiment 1 and Embodiment 2 are combined and, in addition to when there is an abnormality, the sound effect is lengthened and output on the basis of the pseudo-emotion of the robot 200 so as to seem natural.

Figure 16:
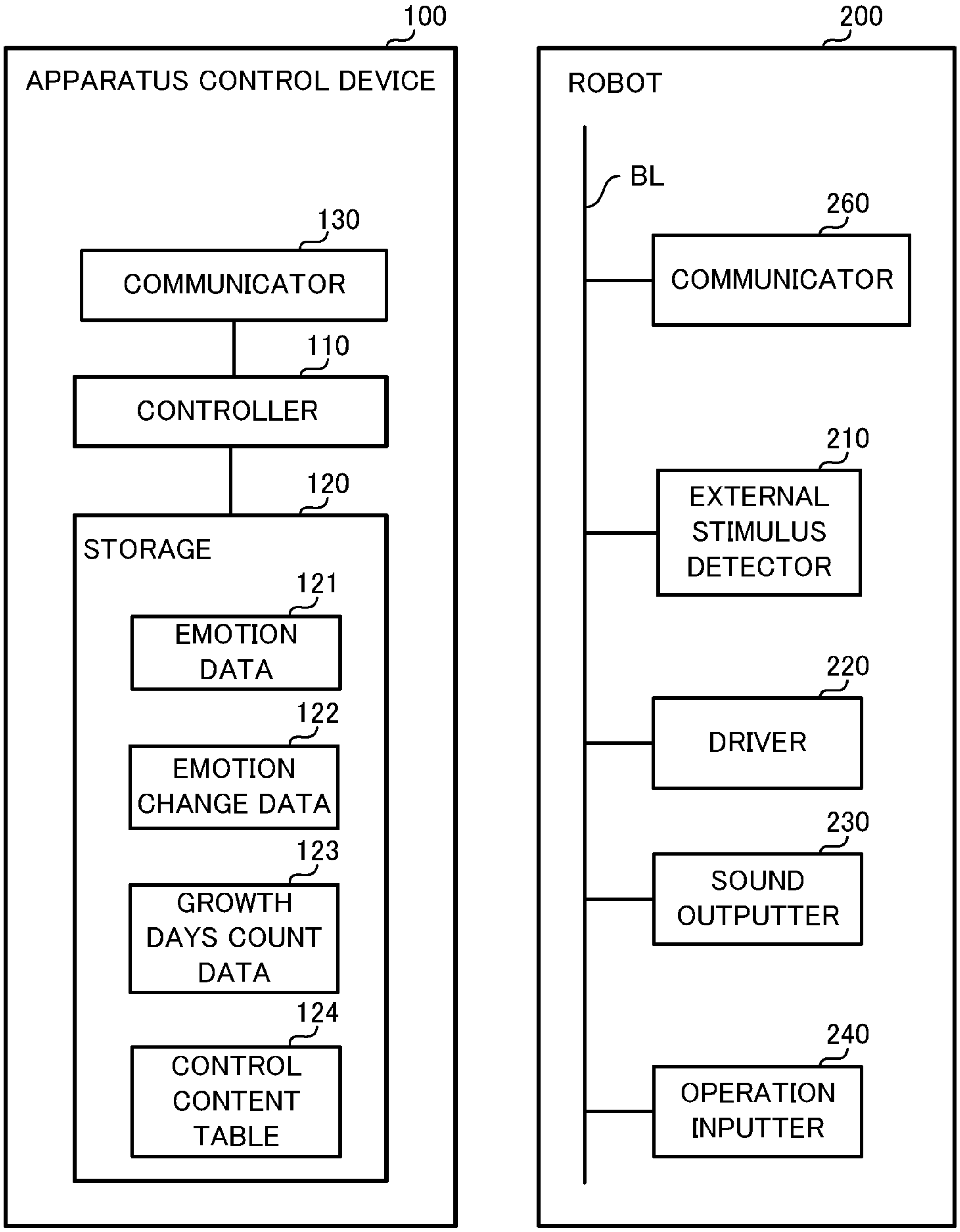
FIG. 16 is a block diagram illustrating the functional configuration of an apparatus control device and a robot according to a modified example.

In the embodiments described above, a configuration is described in which the apparatus control device 100 is built into the robot 200, but a configuration is possible in which the apparatus control device 100 is not built into the robot 200. For example, a configuration is possible in which, as illustrated in FIG. 16, the apparatus control device 100 according to a modified example is not built into the robot 200, and is configured as a separate device (for example, a server). In this modified example, the apparatus control device 100 includes a communicator 130, the robot 200 includes a communicator 260, and the communicator 130 and the communicator 260 are configured so as to be capable of exchanging data with each other. Moreover, the controller 110 acquires, via the communicator 130 and the communicator 260, the external stimulus detected by the external stimulus detector 210, and controls the driver 220 and the sound outputter 230 via the communicator 130 and the communicator 260.

In the embodiments described above, the apparatus control device 100 is a control device that controls the robot 200. However, the apparatus to be controlled is not limited to the robot 200. Examples of the apparatus to be controlled include a wristwatch, and the like. For example, in the case of a wristwatch that is capable of outputting sound and that includes an acceleration sensor and a gyrosensor, wherein a pseudo-creature can, as an application software, be raised in the apparatus, impacts or the like applied to the wristwatch and detected by the acceleration sensor and the gyrosensor can be envisioned as the external stimulus. Additionally, it is expected that the emotion change data 122 and the emotion data 121 are updated in accordance with this external stimulus, and the sound effect data set in the control content table 124 is adjusted (changed) on the basis of the emotion data 121 from the point in time at which the user wears the wristwatch, and outputted.

Accordingly, a configuration is possible in which, when the wristwatch is being handled roughly, a sad-like sound effect is emitted when the user puts the wristwatch on, and when the wristwatch is being handled with care, a happy-like sound effect is emitted when the user is puts the wristwatch on. Furthermore, when configured so that the emotion change data 122 is set for a first period (for example, fifty days), individuality (pseudo-personality) will develop in the wristwatch on the basis of how the user handles the wristwatch in the first period. That is, the same model of wristwatch becomes a wristwatch that tends to feel happiness in cases in which the wristwatch is handled with care by the user, and becomes a wristwatch that tends to feel sadness in cases in which the wristwatch is handled roughly by the user.

Thus, the apparatus control device 100 is not limited to a robot and can be applied to various apparatuses that include an acceleration sensor, a gyrosensor, and the like, and can provide the applied apparatus with pseudo-emotions, a personality, and the like. Furthermore, the apparatus control device 100 can be applied to various apparatuses to cause a user to feel as if they are pseudo-raising that apparatus.

In the embodiments described above, a description is given in which the action programs executed by the CPU of the controller 110 are stored in advance in the ROM or the like of the storage 120. However, the present disclosure is not limited thereto, and a configuration is possible in which the action programs for executing the various processings described above are installed on an existing general-purpose computer or the like, thereby causing that computer to function as a device corresponding to the apparatus control device 100 according to the embodiments described above.

Any method can be used to provide such programs. For example, the programs may be stored and distributed on a non-transitory computer-readable recording medium (flexible disc, Compact Disc (CD)-ROM, Digital Versatile Disc (DVD)-ROM, Magneto Optical (MO) disc, memory card, USB memory, or the like), or may be provided by storing the programs in a storage on a network such as the internet, and causing these programs to be downloaded.

Additionally, in cases in which the processings described above are realized by being divided between an operating system (OS) and an application/program, or are realized by cooperation between an OS and an application/program, it is possible to store only the portion of the application/program on the non-transitory recording medium or in the storage. Additionally, the programs can be piggybacked on carrier waves and distributed via a network. For example, the programs may be posted to a bulletin board system (BBS) on a network, and distributed via the network. Moreover, a configuration is possible in which the processings described above are executed by starting these programs and, under the control of the operating system (OS), executing the programs in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A robot that resembles an animal, the robot comprising:

a sensor configured to detect an external stimulus acting on the robot;

a motor to cause rotation in a predetermined direction;

a memory storing sound data; and at least one processor configured to, in a case in which a determination is made that a condition for outputting a predetermined sound is satisfied, cause the predetermined sound to be output from a speaker included in the robot by causing the sound data stored in the memory to be played back, wherein the at least one processor in a case in which the external stimulus acting on the robot is detected by the sensor, sets a value of emotion data representing a pseudo-emotion of the robot based on the external stimulus acting on the robot, differentiates a playback speed of the sound data corresponding to a portion of a desinence of the predetermined sound from a playback speed of the sound data corresponding to a portion other than the portion of the desinence of the predetermined sound, such that a manner of change from a tone of the portion other than the portion of the desinence of the predetermined sound to a tone of the portion of the desinence of the predetermined sound changes depending on a difference in the set value of the emotion data, and causes a gesture in accordance with the set value of the emotion data by causing the motor to cause the rotation, wherein at least one predetermined characteristic of the rotation is changed based on the set value of the emotion data.

2. The robot according to claim 1, wherein the at least one processor causes the predetermined sound to be output by causing the sound data stored in the memory to be played back repeatedly.

3. The robot according to claim 1, wherein the at least one processor determines that the condition for outputting the predetermined sound is satisfied in a case in which a falling state, a rolling state, a picked-up state, or a rotating state is detected as an abnormal state of the robot.

4. The robot according to claim 1, further comprising:

a head; and a torso, wherein the motor causes the head to rotate in the predetermined direction with respect to the torso, and the at least one processor causes the gesture in accordance with the set value of the emotion data to be performed by causing the motor to cause the rotation of the head with respect to the torso.

5. The robot according to claim 4, wherein the at least one characteristic of the rotation comprises at least one of rotation speed and rotation range so that the at least one processor changes, in accordance with the set value of the emotion data, at least one of the rotation speed and the rotation range of the rotation of the head with respect to the torso that is caused by the motor.

6. A control method implementable by a robot that resembles an animal, the control method comprising:

executing control processing of, in a case in which a determination is made that a condition for outputting a predetermined sound is satisfied, causing the predetermined sound to be output from a speaker included in the robot by causing sound data stored in a memory to be played back, wherein the control processing includes in a case in which an external stimulus acting on the robot is detected by a sensor included in the robot, setting a value of emotion data representing a pseudo-emotion of the robot based on the external stimulus acting on the robot, differentiating a playback speed of the sound data corresponding to a portion of a desinence of the predetermined sound from a playback speed of the sound data corresponding to a portion other than the portion of the desinence of the predetermined sound, such that a manner of change from a tone of the portion other than the portion of the desinence of the predetermined sound to a tone of the portion of the desinence of the predetermined sound changes depending on a difference in the set value of the emotion data, and causing a gesture in accordance with the set value of the emotion data to be performed by causing a motor included in the robot to cause rotation, wherein at least one predetermined characteristic of the rotation is changed based on the set value of the emotion data.

7. The control method according to claim 6, wherein the control processing includes causing the predetermined sound to be output by causing the sound data stored in the memory to be played back repeatedly.

8. The control method according to claim 6, wherein the control processing includes determining that the condition for outputting the predetermined sound is satisfied in a case in which a falling state, a rolling state, a picked-up state, or a rotating state is detected as an abnormal state of the robot.

9. The control method according to claim 6, wherein the robot includes a head; and a torso, the motor causes the head to rotate in a predetermined direction with respect to the torso, and the control processing includes causing the gesture in accordance with the set value of the emotion data to be performed by causing the motor to cause the rotation of the head with respect to the torso.

10. The control method according to claim 9, wherein the at least one characteristic of the rotation comprises at least one of rotation speed and rotation range so that the control processing includes changing, in accordance with the set value of the emotion data, at least one of the rotation speed and the rotation range of the rotation of the head with respect to the torso that is caused by the motor.

11. A non-transitory computer-readable recording medium storing a program that causes a computer of a robot that resembles an animal to execute:

control processing of, in a case in which a determination is made that a condition for outputting a predetermined sound is satisfied, causing the predetermined sound to be output from a speaker included in the robot by causing sound data stored in a memory to be played back, wherein the control processing includes in a case in which an external stimulus acting on the robot is detected by a sensor included in the robot, setting a value of emotion data representing a pseudo-emotion of the robot based on the external stimulus acting on the robot, differentiating a playback speed of the sound data corresponding to a portion of a desinence of the predetermined sound from a playback speed of the sound data corresponding to a portion other than the portion of the desinence of the predetermined sound, such that a manner of change from a tone of the portion other than the portion of the desinence of the predetermined sound to a tone of the portion of the desinence of the predetermined sound changes depending on a difference in the set value of the emotion data, and causing a gesture in accordance with the set value of the emotion data to be performed by causing a motor included in the robot to cause rotation, wherein at least one predetermined characteristic of the rotation is changed based on the set value of the emotion data.

12. The non-transitory computer-readable recording medium according to claim 11, wherein the control processing includes causing the predetermined sound to be output by causing the sound data stored in the memory to be played back repeatedly.

13. The non-transitory computer-readable recording medium according to claim 11, wherein the control processing includes determining that the condition for outputting the predetermined sound is satisfied in a case in which a falling state, a rolling state, a picked-up state, or a rotating state is detected as an abnormal state of the robot.

14. The non-transitory computer-readable recording medium according to claim 1, wherein the robot includes
a head; and
a torso, the motor causes the head to rotate in a predetermined direction with respect to the torso, and the control processing includes causing the gesture in accordance with the set value of the emotion data to be performed by causing the motor to cause the rotation of the head with respect to the torso.

15. The non-transitory computer-readable recording medium according to claim 14, wherein the at least one characteristic of the rotation comprises at least one of rotation speed and rotation range so that the control processing includes changing, in accordance with the set value of the emotion data, at least one of the rotation speed and the rotation range of the rotation of the head with respect to the torso that is caused by the motor.

* * * * *